Dec. 19, 1967 W. A. MILLER ETAL 3,359,427

BISTABLE CIRCUIT WITH NEGATIVE RESISTANCE DIODE

Filed Jan. 13, 1960 2 Sheets-Sheet 1

INVENTORS
JACK Y. ROBERTSON &
WILBUR A. MILLER

BY John V. Regan
ATTORNEY

INVENTORS
JACK Y. ROBERTSON &
WILBUR A. MILLER
BY John V. Regan
ATTORNEY

United States Patent Office 3,359,427

Patented Dec. 19, 1967

3,359,427
BISTABLE CIRCUIT WITH NEGATIVE RESISTANCE DIODE

Wilbur A. Miller, Levittown, Pa., and Jack Y. Robertson, Collingswood, N.J., assignors to Radio Corporation of America, a corporation of Delaware

Filed Jan. 13, 1960, Ser. No. 2,248
41 Claims. (Cl. 307—88.5)

This invention relates to switching circuits and, more particularly, to bistable multivibrators, or flip-flops, each employing a diode which has a negative resistance region within its operating characteristic. Such diodes are termed hereinafter "negative resistance diodes."

A bistable multivibrator, or flip-flop, may be defined as a circuit having two stable operating states and requiring two input pulses to complete a cycle of operation. The flip-flop remains in either stable state until caused to change to its other state, as for example, by the application of a proper input signal. Flip-flop circuits may be either complementing or noncomplementing.

A noncomplementing flip-flop generally has two separate input terminals. An input signal of the proper polarity applied to one of the input terminals causes the flip-flop to change from the first stable state to the second, but not from the second stable state to the first. Similarly, an input of the proper polarity applied to the other input terminal causes the flip-flop to change from the second stable state to the first, but not vice-versa.

A complementing flip-flop, on the other hand, generally has but a single input terminal. Successive input pulses of the proper polarity applied to the input terminal cause the flip-flop to alternately change state.

It is an object of this invention to provide novel complementing and noncomplementing flip-flops.

It is another object of this invention to provide flip-flops which have low power requirements and which embody a reduced number of components.

It is still another object of this invention to provide novel flip-flops which are highly reliable in operation.

It is yet another object of the invention to provide a flip-flop which uses only one transistor and which is not subject to the unreliability of operation usually occasioned by a change in transistor parameters.

Yet another object of the present invention is to provide flip-flops of the type described above which employ negative resistance diodes.

These and other objects of the present invention are accomplished by connecting a negative resistance diode in the control circuit of a transistor. The diode is biased to operate as a bistable device, and successive pulses applied thereto alternately switch the diode between a first stable state characterized by high voltage and a second stable state characterized by low voltage. The terms "high" and "low," as they are used here, denote high and low relative to each other. The parameters of the diode biasing circuit may be adjusted so that the transistor is cut-off when the diode is in one stable state and is driven into heavy conduction when the diode is triggered to the other stable state.

In the following drawings, like reference characters refer to like components and;

Figure 1:
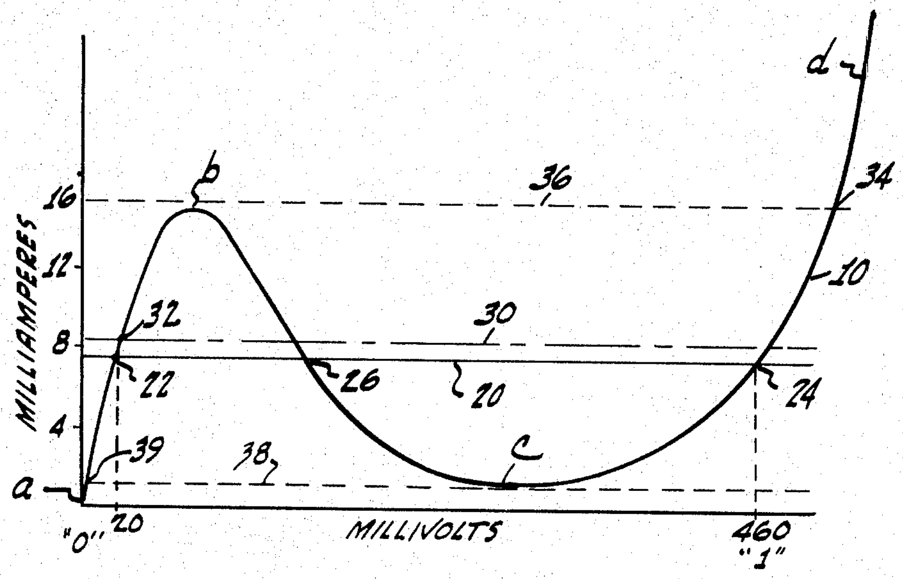
FIGURE 1 is a characteristic curve of one type of negative resistance diode, which curve is useful in explaining the operation of the flip-flop circuits of the present invention.

A characteristic curve 10 of current versus voltage for one type of negative resistance diode is illustrated in FIGURE 1. The particular values of voltage and current given in FIGURE 1 are by way of illustration only, and it is to be understood that these values constitute no limitation of the invention. The current range, for example, may vary from one diode to another. The portions *ab* and *cd* of the curve 10 are regions of positive resistance, that is to say, the inverse of the slope has a positive value in these regions. The portion *bc* is a region of negative resistance.

Figure 2:
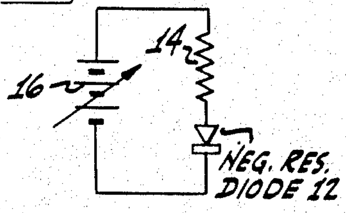
FIGURE 2 is a schematic diagram of a simplified circuit from which the curve of FIGURE 1 may be derived.

A circuit for ascertaining the characteristic curve 10 of a negative resistance diode 12 is illustrated schematically in FIGURE 2. The diode 12 is connected in series with a resistor 14 and a source 16 of energizing potential. The diode 12 is poled in the direction of easy current conduction. The value of the resistor 14 is many times greater, for example ten or more, than the resistance of the diode 12, and may include the resistance of the source 16. In this case, therefore, the source 16 appears to the diode 12 virtually as a constant current source. Assume that the values of the resistor 14 and the source 16 are chosen so that the diode 12 has the load line 20 illustrated in FIGURE 1. This load line 20 intersects the positive portions *ab* and *cd* of the curve 10 at points 22 and 24, respectively. The load line 20 also intersects the negative resistance portion *bc* at a point 26. The two points 22, 24 of intersection with the positive resistance regions are points of stable operation. The point 26 of intersection with the negative resistance region *bc* is a point of unstable operation. The two stable points 22, 24 of operation may have particular significance depending upon the circuit application. In computer applications for example, the stable operating point 24 of high voltage may represent storage of a binary "one"; the stable operating point 22 of low voltage may represent storage of a binary "zero."

Assume that initially the voltage across the diode is slightly less than 20 millivolts, corresponding to the intersection 22. As the diode 12 current is increased slightly in the forward direction to approximately 8½ milliamperes, as by increasing the source 16 voltage, the load line is shifted upwards on the curve 10 to the position occupied by load line 30. The diode 12 remains in a low voltage state because the load line 30 has a point 32 of intersection with the positive resistance region *ab*. The point 32 corresponds to a voltage of 20 millivolts across the diode 12. The load line continues to shift upwards as the current flowing through the diode 12 is increased further in the forward direction. The diode 12, however, remains in a low voltage state so long as the current does not exceed a critical value corresponding to the highest load line which still intersects the positive resistance portion *ab*. When the current is increased above the critical value, say to 16 milliamperes, the diode 12 switches rapidly through the negative resistance region to a stable operating point 34 of high voltage, represented by the intersection of the load line 36 with the positive resistance portion *cd* of the curve 10. If now the current is reduced to its initial value, the operating point moves down on the curve 10 to the point 24 of intersection of the original load line 20 and the portion *cd* of the curve 10.

The diode 12 may be switched back to the low voltage state by reducing sufficiently the current through the diode 12. When the current is reduced below a value at which the load line intersects the portion *cd*, the diode switches rapidly through the negative resistance region to a stable operating point of low voltage. This condition obtains, for example, when the load line is shifted downwards to the position occupied by the load line 38. The stable operating point of low voltage in this case is represented by the point 39 of intersection of the load line 38 and the portion *ab* of curve 10. If the current is now returned to its initial value, the operating point moves upwards on the curve 10 to the point 22.

In a practical circuit, the value of the energizing source 16 may be fixed so that the diode 12 has the quiescent load line 20 illustrated in FIGURE 1. The diode 12 may then be switched from the low voltage state (point 22) to the high voltage state (point 24) by the application of a short pulse of current which, when added to the current supplied by the energizing source 16, exceeds the aforementioned critical value. In like manner, the diode 12 may be switched from the high voltage state to the low voltage state by a current pulse of the opposite polarity and of sufficient magnitude.

Discussion of some of the above and other aspects of a negative resistance diode appears in the article by H. S. Sommers, Jr., in the Proceedings of the IRE, July 1959, at page 1201.

Figure 3:
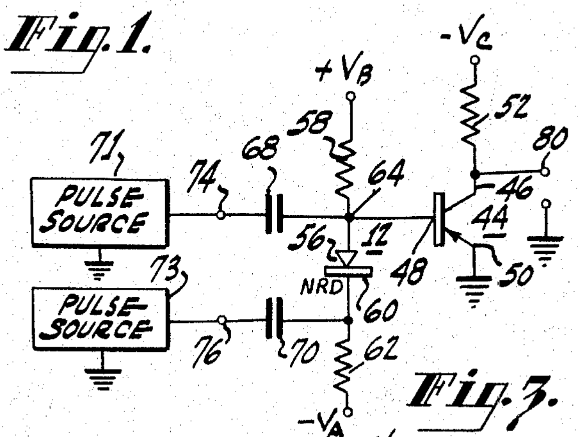
FIGURE 3 is a schematic diagram of one form of noncomplementing flip-flop according to the invention.

One form of noncomplementing flip-flop according to the invention is illustrated schematically in FIGURE 3. The flip-flop comprises a PNP transistor 44 having collector, base, and emitter electrodes 46, 48, 50 respectively. The collector electrode 46 is connected by a resistor 52 to a source of energizing potential, designated $-V_C$. The emitter electrode 50 is connected to a source of reference potential, illustrated by the conventional symbol for circuit ground. A negative resistance diode 12 has its anode 56 connected by a resistor 58 to a source of biasing potential, designated $+V_B$. The cathode 60 is connected by a resistor 62 to a source of biasing potential, designated $-V_A$. The sources $-V_A$, $+V_B$, and $-V_C$ may be, for example, batteries (not shown). The base electrode 48 of the transistor 44 is connected to the diode 12 anode 56 at a point 64 intermediate the anode 56 and resistor 58. The diode 12 is, therefore, connected in the external emitter-base path of the transistor 44 and in circuit with the emitter-base diode of the transistor. Input trigger pulses from a first source 71 may be coupled to the anode 56 through a coupling capacitor 68. Input trigger pulses from a second source 73 may be coupled to the cathode 60 by way of a coupling capacitor 70. The trigger pulses, as previously mentioned, may be current pulses of very short duration.

The diode 12 may be alternately switched between its high and low voltages stable states by any of the following methods:

(1) Applying the positive current pulses alternately at input terminals 74 and 76;

(2) Applying negative current pulses alternately at input terminals 74 and 76;

(3) Applying positive and negative current pulses alternately at input terminal 74; and (4) Applying positive and negative current pulses alternately at input terminal 76.

The operation of the circuit may be understood best with reference to the characteristic curve 10 of FIGURE 1. The values of the resistors 58 and 62 and the biasing sources $-V_A$ and $+V_B$ in the diode 12 biasing circuit are adjusted so that the diode 12 has the load line 20 intersecting the characteristic curve 10 at points 22, 24 and 26. The values of the components in the diode 12 biasing circuit are also adjusted so that the voltage at the anode 56 (and, hence, the voltage at the base electrode 48) is slightly positive with respect to ground when the diode 12 is in its high voltage state. Under these conditions the transistor 44 is biased below cutoff and the voltage at the output terminal 80 is approximately $-V_C$ when the diode 12 is in the high voltage state.

In accordance with the first method of operation described above, and assuming that the diode 12 is initially in its high voltage state, the first positive current pulse applied at the lower input terminal 76 is coupled to the cathode 60 by way of the input capacitor 70 and reduces the voltage differential across the diode 12. The current flowing through the diode 12 is reduced sharply in response to the input pulse, and the load line 20 of diode 12 is shifted temporarily downwards. The magnitude of the positive current pulse applied at the input terminal 76 is adjusted so that the temporary load line (for example, load line 38) has no intersection with the positive resistance region *cd*. In consequence thereof, the diode 12 is switched to a low voltage state and, at the termination of the input pulse, the diode 12 tends to stabilize at the point 22 of intersection of the characteristic curve 10 and the load line 20. However, the voltage at the anode 56 is lowered below ground potential when the diode 12 is switched to the low voltage state, again because of the values of the components in the diode 12 biasing circuit.

The transistor 44 is biased into conduction when the voltage at the base electrode 48 drops below ground potential. The voltage at the base electrode 48 actually is lowered an amount sufficient to drive the transistor 44 into very heavy conduction, for example, saturation, and the voltage at the output terminal is raised towards ground potential. The conducting transistor 44 acts somewhat as a current source for the diode 12, inasmuch as the base current flows through the diode 12. This increase in current through the diode 12 shifts the operating point slightly upwards on the characteristic curve 10, for example to the point 32. This point 32 represents the stable operating condition of the diode 12 when the transistor 44 is conducting.

The next occurring positive current pulse is applied to the upper input terminal 74. This pulse is coupled to the junction 64 of the anode 56 and the base electrode 48. The input pulse serves two purposes; first, the positive pulse reverse-biases the emitter-base diode of the transistor 44 and cuts off the transistor, and; second, the positive pulse increases temporarily the current flowing through the diode 12 and raises the load line above the point *b* of the characteristic curve 10. The diode 12 then switches to the high voltage state indicated, for example, by the point 34 of intersection of the load line 36 with the positive resistance region *cd*. The load line drops down to its original position (load line 20) at the termination of the input pulse. There may be a slight overshoot temporarily below the point 24 because of capacitor 68 discharge. This overshoot may be minimized, however, by proper selection of the RC time constant.

It will be recognized from the above discussion and from FIGURE 1 that the negative resistance diode 12 is itself a bistable flip-flop device; however, the power provided by the diode 12 generally is insufficient to drive other circuits or stages. Moreover, the diode 12 is a two-terminal device with no isolation between input and output thereof. For these reasons serious problems often are encountered in attempting to cascade diode stages. The transistor 44, in addition to providing the desired power gain for driving other circuits, also provides isolation between the input terminals 74, 76, and the output terminals 80, whereby several circuits may be cascaded conveniently.

The flip-flop circuit of FIGURE 3 has its fastest switching speed when operating in accordance with the third method described above, that is to say, by alternately applying positive and negative current pulses to the upper input terminal 74. Assuming that the diode 12 is initially in its low voltage state (point 32) with the transistor 44 in heavy conduction, the first positive current pulse applied at the upper input terminal 74 reverse-biases the emitter-bias diode of the transistor 44 and biases the transistor below cutoff. This positive pulse also increases sharply the current flow through the diode 12 and raises the load line above the peak *b* of the characteristic curve 10, switching the diode 12 to its high voltage stable state. It is to be noted that the positive pulse cuts off the transistor 44 almost immediately, irrespective of any delay in switching the diode 12, because the positive pulse is coupled directly to the base electrode 48.

The next applied negative current pulse to the upper input terminal 74 is of such amplitude that it immediately forward biases the emitter-base diode of the transistor 44 and drives the transistor 44 into heavy conduction. The negative current pulse also reduces temporarily the current flow through the diode 12 and switches the diode 12 to its low voltage state. Here again, triggering of the transistor 44 does not depend upon the switching time of the diode 12 because the negative triggering pulse is coupled directly to the base electrode 48. The operating speed of the flip-flop according to this method is faster than the operating speed of most known two-transistor multivibrators because here there is eliminated the delay in switching usually occasioned by the interaction between one transistor being turned "off" and the other transistor being turned "on."

A practical circuit such as the one illustrated in FIGURE 3 may have the following circuit parameters when the diode 12 has the characteristic 10 and values illustrated in FIGURE 1:

| | | |
|---|---|---|
| Resistor **58** | ohms | 820 |
| Resistor **62** | do | 20 |
| Capacitors **68** and **70** | μμfarads | 200 |
| $V_B$ | volts | +6 |
| $-V_A$ | volt | −0.5 |
| Anode **56** voltage: | | |
| High state | do | ≈0.1 |
| Low state | do | ≈−0.3 |

A noncomplementing flip-flop of the type described above may also employ an NPN-type transistor. Such a circuit is shown schematically in FIGURE 4. Components similar to those illustrated in FIGURE 3 are designated by like reference characters. The polarities of the energizing sources $V_A$, $V_B$, and $V_C$ are reversed from those indicated in FIGURE 3. Connections to the diode 12 are also reversed so that the diode is biased in the forward direction. The voltage at the cathode 60 (and the base electrode 86) is approximately −0.1 volt when the diode 12 is in the high voltage stable state, and is approximately +0.3 volt when the diode 12 is in the low voltage stable state and the resistors 58 and 62 have the values indicated in the above example. A base-emitter voltage of −0.1 volt is sufficient to bias the transistor 84 below cutoff, and the bias of +0.3 volt is sufficient to drive the transistor 84 into heavy conduction.

Figures 4, 5:
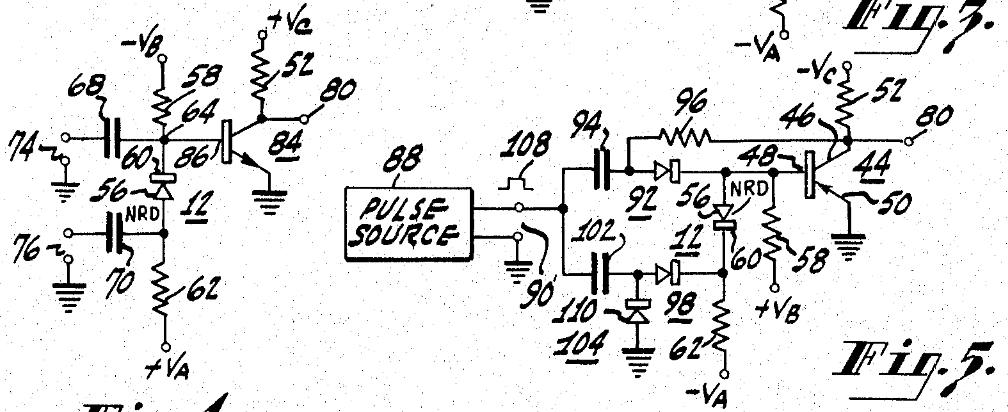
FIGURE 4 is a schematic diagram of a modified form of the FIGURE 3 circuit.
FIGURE 5 is a schematic diagram of a complementing flip-flop according to the invention.

The operation of the FIGURE 4 circuit is the same as that of the FIGURE 3 circuit with the exception that current pulses of a given polarity applied at input terminals 74, 76 have the opposite effect in the two circuits of FIGURES 3 and 4.

One embodiment of a complementing bistable multivibrator, or flip-flop, according to the present invention is illustrated schematically in FIGURE 5. Here again, components like those in FIGURE 3 are designated by like reference characters. A single pair of input terminals 90 is provided for applying current trigger pulses to the diode 12 from a pulse source 88. One of the input terminals 90 is connected to circuit ground. The anode 56 of the diode 12 is connected to one terminal of a unilateral current conducting device, illustrated as a diode 92. The other terminal of the diode 92 is connected (a) by way of a coupling capacitor 94 to the other one of the input terminals 90, and (b) through a resistor 96 to the collector electrode 46 of the transistor 44. The cathode 60 of the diode 12 is connected to one terminal of another unilateral conducting device 98. The other terminal of the latter unilateral conducting device 98 is connected to a junction point 100. A capacitor 102 is connected between this junction point 100 and the ungrounded one of the input terminals 90. A third unilateral conducting device 104 is connected between the junction point 100 and circuit ground. The unilateral conducting devices 92, 93 and 104 may be, for example, crystal diodes. The diodes 92 and 98 are poled in the direction of easy conventional current flow from the source 88 to the transistor 44, and thus in a direction tending to be forward biased in response to positive current pulses 108 applied at the input terminals 90. The shunt diode 104 has its anode 110 connected to ground and serves as a recovery diode for discharging the capacitor 102. For reasons which will be presently explained, the capacitor 94 is chosen to have a larger capacity (for example, twice) than the capacitor 102.

The operation of the circuit of FIGURE 5 may be explained best with reference to the characteristic curve 10 of FIGURE 1. Assume that the negative resistance diode 12 has the characteristic curve 10 and that the parameters of the diode 12 biasing circuit are chosen to provide the load line 20. The stable operating point 24 represents the high voltage stable state of the diode 12, at which the transistor 44 is biased below cutoff. The voltage at the collector electrode 46, the output terminal 80, and the anode of the diode 92 is approximately $-V_C$ when the negative resistance diode 12 is in the high voltage state. A positive current pulse 108 applied at the input terminals 90 at this time is not sufficient to overcove the large reverse bias across the diode 92 provided by the collector 46 voltage $-V_C$. However, the diode 98 is not reverse-biased, and the input pulse 108 is coupled to the cathode 60 of the negative resistance diode 12. Current flow through the negative resistance diode 12 is reduced sharply in response to the input pulse. The input signal 108 is of such amplitude that the diode 12 current is reduced enough to switch the diode 12 to the low voltage state.

The transistor 44 conducts heavily when the diode 12 is in the low voltage state, and the collector 46 voltage rises in a positive direction close to ground potential. This rise in collector 46 potential reduces greatly the reverse bias on diode 92. (The diode 92 may even become forward-biased). The next-applied positive input pulse 108 forward-biases both of the diodes 92 and 98. Because the capacitor 94 is larger than the capacitor 102, the time constant of capacitor 94 and resistor 62 is greater than the time constant of capacitor 102 and resistor 62. In consequence thereof, the positive signal coupled through the capacitor 94 is effective for a longer time period than the signal coupled through capacitor 102. The positive input at the anode 56 increases the current through the diode 12 and switches the diode 12 to the high voltage state. The diodes 92 and 98 act, in effect, to steer the input pulse 108. Upon termination of the second positive pulse, the transistor 44 is cut-off. The flip-flop changes state in response to each applied positive input pulse 108.

Figure 6:
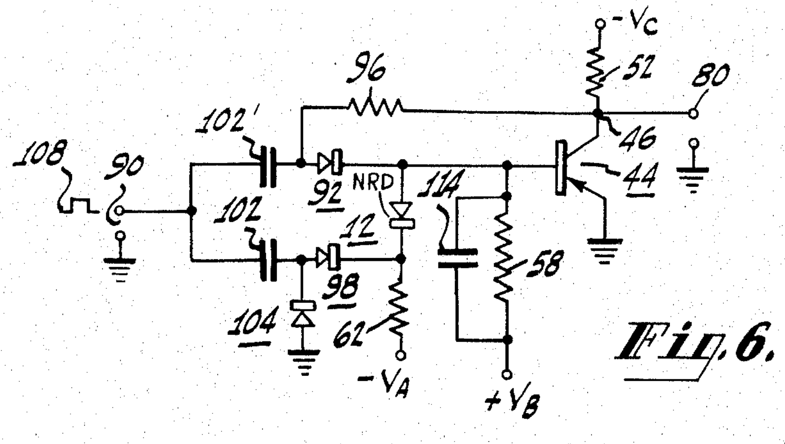
FIGURE 6 is a schematic diagram of another complementing flip-flop according to the invention.

Another complementing flip-flop according to the invention is illustrated schematically in FIGURE 6. The circuit generally is similar to the flip-flop illustrated in FIGURE 5. In this case, however, the input coupling capacitors 102, 102' have the same value of capacity. A capacitor 114 is connected in parallel with the biasing resistor 58.

The collector 46 voltage is close to $-V_C$ when the negative resistance diode 12 is in the high voltage state. The diode 92 has, therefore, a large reverse bias. A positive pulse applied at the input terminals 90 at this time is ineffective to forward bias the upper diode 92. The input pulse, however, forward biases the lower diode 98. Current flow through the negative resistance diode 12 momentarily is reduced sharply in response to the input pulse, coupled through capacitor 102, and the negative resistance diode 12 switches to the low voltage state.

The shunt capacitor 114 in the biasing circuit provides a reduced impedance to pulses applied at the input terminals 90. It might be assumed that one-third of the charging current for capacitor 102 flows upwards (cathode-to-anode) through the negative resistance diode 12 and that two-thirds of the charging current flows downwards through resistor 62. Also, one-third the charging current for the upper capacitor 102' flows downwards through the parallel combination of resistor 58 and capacitor 114, and two-thirds flows downwards through the negative resistance diode 12. When both input diodes 92, 98 conduct, a net current flow of one-third the charging current flows downwards through the negative resistance diode 12. This condition occurs when the negative resistance diode 12 is in the low voltage state and an input pulse 108 is applied. The net downward flow of current through the negative resistance diode 12 is sufficient to switch the diode 12 to the high voltage state.

Figure 7:
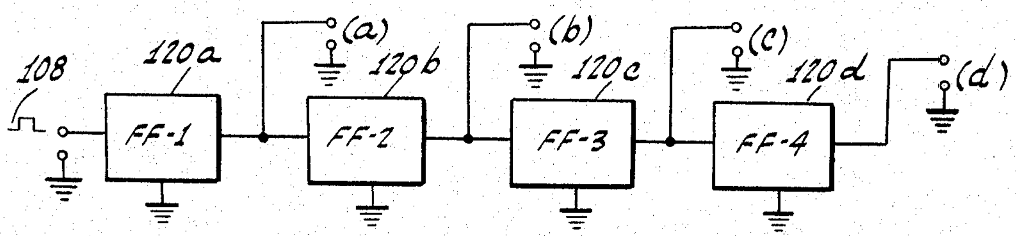
FIGURE 7 is a block diagram of a counter, each stage of which may employ, for example, a complementing flip-flop of the type illustrated in FIGURE 6.

A four-stage binary counter is illustrated in FIGURE 7. Each of the stages **120*a*–120*d* has two stable operating states and may comprise, for example, a complementing flip-flop circuit of the type illustrated in FIGURE 6. Each stage goes through a complete cycle of operation in response to two input pulses applied at its input. Initially, each of the stages 120*a*–120*d* stores a binary zero corresponding, for example, to the operating point 32** of FIGURE 1.

Figure 8:
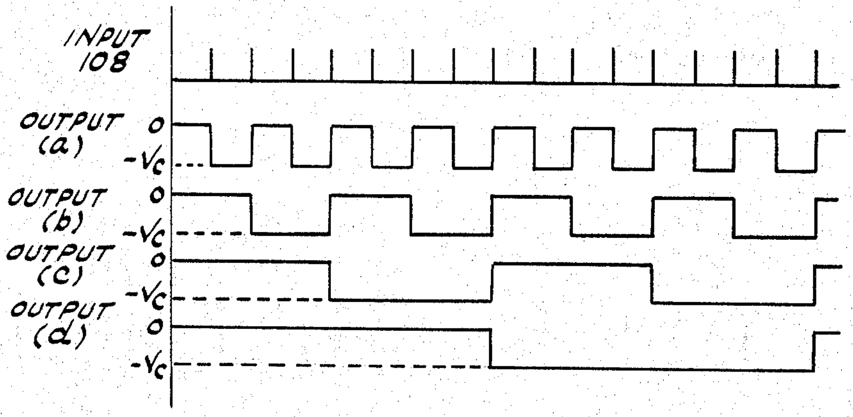
FIGURE 8 is a set of waveforms of the outputs which are derived from the individual stages of the counter of FIGURE 7.

The first applied input pulse 108 switches the negative resistance diode 12 of the first stage **120*a*** to its high voltage stable state, causing the output (*a*) of the first stage **120*a*** to decrease to $-V_C$ volts. This is illustrated in FIGURE 8. However, the negative going output (*a*) is not of the proper polarity to trigger the second stage **120*b***; the output (*b*) of the second stage **120*b* remains at approximately zero volts. The second applied input pulse 108 switches the negative resistance diode 12 of the first stage 120*a* back to the low voltage state and drives the transistor 44 (see FIGURE 6) of that stage into heavy conduction. The voltage at the collector electrode 46** rises in a positive direction towards zero volts. This positive output (*a*) is of the proper polarity to trigger the second flip-flop stage **120*b* into the high voltage state, whereupon its transistor cuts-off and the output voltage of that stage 120*b*** decreases to approximately $-V_C$ volts.

The outputs (*a*)–(*d*), respectively, of the stages **120*a*–120*d* are illustrated by the waveforms of FIGURE 8, all of which are drawn to the same time scale. The input pulses 108** to be counted are shown on the top line of FIGURE 8. Thus the counter cycles through the binary conditions 0000–1111 for each sixteen input signals as indicated in the timing diagram of FIGURE 8.

What is claimed is:

1. The combination comprising a transistor having a base electrode, an emitter electrode and a collector electrode; means for applying operating potentials to said transistor; a negative resistance diode connected externally in the emitter-base path of said transistor, said negative resistance diode having a cathode and an anode, and means applying pulses of one polarity to said cathode and said anode alternately.

2. A bistable flip-flop comprising, in combination, an active electron control device having an input electrode and two other electrodes; means for applying operating potentials to said control device; a negative resistance diode connected between said input electrode and one of said two other electrodes, said diode having an anode and a cathode, said diode having a volt-ampere characteristic defined by two regions of positive resistance separated by a region of negative resistance; and means applying alternately to said cathode and said anode energizing pulses having a magnitude greater than a predetermined value.

3. The combination comprising an active electron control device having an input electrode and two other electrodes; a negative resistance diode connected between said input electrode and one of said two other electrodes, said diode having an anode and a cathode, said diode having a volt-ampere characteristic defined by two regions of positive resistance separated by a region of negative resistance; and means applying pulses to said cathode and said anode alternately.

4. A bistable flip-flop comprising, in combination, an active electron control device having an input electrode and two other electrodes; a negative resistance diode connected between said input electrode and one of said other electrodes, said diode having two terminals; circuit means biasing said diode for operation as a bistable device; and means applying pulses to said two terminals alternately.

5. A bistable circuit comprising, in combination, a transistor having base and emmiter electrodes defining a base-emitter diode; a negative resistance diode connected between said base and emitter electrodes and having two terminals; means biasing said negative resistance diode for operation as a bistable device such that said base-emitter diode is forward biased and reverse biased, respectively, in correspondence with the two stable states of said negative resistance diode; and means for applying switching pulses alternately to said two terminals.

6. A bistable circuit comprising, in combination, a transistor having a base-emitter diode; a negative resistance diode connected in circuit with said base-emitter diode and having two electrodes; means biasing said negative resistance diode for bistable operation; means for applying switching pulses from a first source to one of said two electrodes; and means for applying switching pulses from a second source to the other of said two electrodes.

7. A bistable circuit comprising, in combination, a transistor having a base-emitter diode; a negative resistance diode connected in circuit with said base-emitter diode and having two electrodes; a first and a second source of energizing pulses; and first and second means respectively connecting said first and said second source of pulses to different ones of said electrodes.

8. A bistable circuit comprising, in combination, a transistor having a base-emitter diode; a negative resistance diode connected in circuit with said base-emitter diode and having two electrodes; means biasing said negative resistance diode for bistable operation; a first source of switching pulses operatively connected to one of said two electrodes; and a second source of switching pulses operatively connected to the other of said two electrodes.

9. A bistable multivibrator comprising, in combination, a transistor having a base-emitter diode; a negative resistance diode connected in circuit with said base-emitter diode, said negative resistance diode having two electrodes; circuit means biasing said negative resistance diode for bistable operation; a source of switching pulses; and input means steering said switching pulses alternately to said two electrodes for switching said negative resistance diode between its two stable states.

10. A complementing flip-flop comprising, in combination, a transistor having base and emitter electrodes; a negative resistance diode connected between said base and emitter electrodes and having a cathode and an anode; biasing circuit means forward biasing said negative resistance diode for bistable operation; a source of switching pulses; and first and second input means of different impedances respectively connecting said anode and said cathode to said source of switching pulses.

11. The combination comprising a transistor having a control electrode, an output electrode, and another electrode; a tunnel diode connected between said control electrode and said another electrode; means biasing said tunnel diode for bistable operation; an input terminal for receiving trigger pulses; a first capacitor and a first unidirectional conducting device serially connected between said input terminal and one electrode of said tunnel diode; and a second unidirectional conducting device and a second capacitor, different in value from said first capacitor, serially connected between said input terminal and the other electrode of said tunnel diode.

12. The combination claimed in claim 11 including direct current coupling means connected between said output electrode and a point common to said second capacitor and said second unidirectional conducting device.

13. The combination comprising a transistor having a control electrode, an output electrode, and another electrode; a tunnel diode connected between said control electrode and said another electrode; circuit means biasing said tunnel diode for bistable operation; a capacitor connected in said circuit means; an input terminal for receiving trigger pulses; a first coupling capacitor and a first unidirectional conducting device serially connected between said input terminal and one electrode of said tunnel diode; and a second coupling capacitor and a second unidirectional conducting device serially connected between said input terminal and the other electrode of said tunnel diode.

14. The combination claimed in claim 13 including a direct current coupling element connected between said output electrode and a point common to said second coupling capacitor and said second unidirectional conducting device.

15. The combination comprising: a transistor having a control electrode, an output electrode, and another electrode; a tunnel diode connected between said control electrode and said another electrode; means biasing said tunnel diode for bistable operation; an input terminal for receiving trigger pulses; a first capacitor and a first unidirectional conducting device serially connected between said input terminal and one electrode of said tunnel diode; and a second unidirectional conducting device and a second capacitor serially connected between said input terminal and the other electrode of said tunnel diode.

16. The combination claimed in claim 15 including direct current coupling means connected between said output electrode and a point common to said second capacitor and said second unidirectional conducting device.

17. A binary circuit comprising a tunnel diode having two electrodes, means including a bias source supplying a bias voltage through said two electrodes of said tunnel diode for bistability thereof, a pair of rectifying diodes, each connected to one of said electrodes of said tunnel diode, a pair of biasing, power sources, each supplying biasing voltage to one of said rectifying diodes and means to supply at least one series of pulse signals to said tunnel diode through each of said rectifying diodes.

18. A bistable, binary circuit comprising only one, common, tunnel diode having two electrodes, bias means across said tunnel diode including a bias voltage source and two resistors each connected to one of said two electrodes, a pair of rectifying diodes, each connected to one of said electrodes, a pair of biasing power sources each including a resistor and supplying biasing voltage to one of said rectifying diodes, a pair of capacitors, and means to supply at least one series of pulse signals through said capacitors to said two rectifying diodes and to each one of said two electrodes of said tunnel diode.

19. A flip-flop comprising only one, voltage controlled device of the type having a characteristic with a negative resistance region between two regions of positive resistance, means connected across said device to bias it for bistability, two different power sources each including only one rectifier and an output, said outputs being across said device, and means to supply at least one series of controlling signal pulses through said rectifiers to said device.

20. A bistable, binary circuit comprising a common device having a characteristic with a negative resistance region between two positive resistance regions, means connected across said device to bias it for bistability in one of said two positive resistance regions, two different power sources and biasing circuit means having said device connected between them to control one of them by one of its said two bistable conditions, each power circuit means including a switchable, one-directional element, and means to supply controlling pulses to said common device through both of said power circuit means and their one-directional elements to switch the bistable condition of said device and to switch one of said one-directional elements.

21. A bistable, binary circuit comprising a common device having a characteristic with a negative resistance region between two positive resistance regions, means connected across said device to bias it for bistability in one of said two positive resistance regions, two different power sources and biasing circuit means having said device connected between them to control one of them by one of its said two bistable conditions, each power circuit means including a switchable, one-directional element, and means to supply controlling pulses to said common device through both of said power circuit means and their one-directional elements to switch the bistable condition of said device and to switch one of said one-directional elements, said device comprising a diode and said last named means comprising a common connection to both of said power circuit means and a source for only one signal set of pulses to modulate alternately the fronts and rears of the single, square type, wave form produced by said two power circuit means.

22. A bistable, binary circuit comprising a common device having a characteristic with a negative resistance region between two positive resistance regions, means connected across said device to bias it for bistability in one of said two positive resistance regions, two different power sources and biasing circuit means having said device connected between them to control one of them by one of its said two bistable conditions, each power circuit means including a switchable, one-directional element, and means to supply controlling pulses to said common device through both of said power circuit means and their one-directional elements to switch the bistable condition of said device and to switch one of said one-directional elements, said device comprising a diode, and said last named means comprising a common connection to both of said power circuit means and sources for two differential signal sets of pulses to alternately modulate the fronts and rears of the single, square type, wave form produced by said two power circuit means according to two different useful signals.

23. A binary circuit comprising a tunnel diode having two electrodes; means including a bias source supplying a bias voltage to said tunnel diode for bistability thereof; a pair of rectifying diodes, each connected to one of said electrodes of said tunnel diode; a pair of biasing power sources each supplying biasing voltage to one of said rectifying diodes; and means to supply at least one series of pulse signals to said tunnel diode through each of said rectifying diodes.

24. A bistable, binary circuit comprising only one, common, tunnel diode having two electrodes; bias means for said tunnel diode including a bias voltage source and two resistors each connected to one of said two electrodes; a pair of rectifying diodes, each connected to one of said electrodes; a pair of biasing power sources each including an element of resistance and supplying biasing voltage to one of said rectifying diodes; a pair of capacitors; and means to supply at least one series of pulse signals through said capacitors to said two rectifying diodes and to each one of said two electrodes of said tunnel diode.

25. A flip-flop comprising only one, voltage controlled device of the type having a characteristic with a negative resistance degion between two regions of positive resistance; means connected to said device to bias it for bistability; two different power sources each including only one rectifier and an output, the outputs being across said device; and means to supply at least one series of controlling signal pulses through said rectifiers to said device.

26. A bistable, binary circuit comprising a common device having a characteristic with a negative resistance region between two positive resistance regions; means connected to said device to bias it for bistability in one of said two positive resistance regions; two different power sources and biasing circuit means having said device connected between them to control one of them by one of its two stable conditions, each power circuit means including a switchable, one-directional element; and means to supply controlling pulses to said common device through both of said power circuit means and their one-directional elements to switch the bistable condition of said device and to switch one of said one-directional elements.

27. A bistable, binary circuit comprising a common device having a characteristic with a negative resistance region between two positive resistance regions; means connected to said device to bias it for bistability in one of said two positive resistance regions; two different power sources and biasing circuit means having said device connected between them to control one of them by one of its two stable conditions, each power circuit means including a switchable, one-directional element; and means to supply controlling pulses to said common device through both of said power circuit means and their one-directional elements to switch the bistable condition of said device and to switch one of said one-directional elements, said device comprising a diode and said controlling pulse supply means comprising a common connection to both of said power circuit means and a source for only one signal set of pulses to modulate alternately the fronts and rears of the single, square type, wave form produced by said two power circuit means.

28. A bistable, binary circuit comprising a common device having a characteristic with a negative resistance region between two positive resistance regions; means connected to said device to bias it bistably in one of said two positive resistance regions; two different power sources and biasing circuit means having said device connected between them to control one of them by one of its two stable conditions, each power circuit means including a switchable, one-directional element; and means to supply controlling pulses to said common device through both of said power circuit means and their one-directional elements to switch the bistable condition of said device and to switch one of said one-directional elements, said device comprising a diode, and said controlling pulse supply means comprising a common connection to both of said power circuit means and sources for two differential signal sets of pulses to alternately modulate the fronts and rears of the single, square type, wave form produced by said two power circuit means according to two different useful signals.

29. The combination comprising: a first circuit loop including a first rectifying diode, a first resistor and a first diode biasing power source connected in series with each other in the loop; a second circuit loop including a second rectifying diode, a second resistor, a second diode biasing power source and a bias source connected in series with each other in the second loop; a tunnel diode connected between the first and second loops and biased bistably by said bias source; and means connected to supply at least one series of pulse signals to said tunnel diode through each of said rectifying diodes.

30. A binary circuit comprising: a first circuit loop including series connected tunnel diode, first resistor, second resistor and source of bias potential having a value to bias said tunnel diode bistably; a second closed circuit loop including series connected first rectifying diode, bias means for said first diode, said second resistor and said source of biasing potential; a third closed circuit loop including series connected second rectifying diode, said first resistor and means for biasing said second rectifying diode; and means to supply at least one series of pulse signals to said tunnel diode through each of the first and second rectifying diodes.

31. A binary circuit comprising a tunnel diode having two electrodes, means including a bias source supplying a bias voltage through said two electrodes of said tunnel diode for bistability thereof, a pair of rectifying diodes, each connected to one of said electrodes of said tunnel diode, a pair of biasing, power source means each supplying biasing voltage to one of said rectifying diodes, and means to supply at least one series of pulse signals to said tunnel diode through each of said rectifying diodes.

32. A bistable, binary circuit comprising only one, common, tunnel diode having two electrodes, bias means across said tunnel diode including a bias voltage source and two resistors each connected to one of said two electrodes, a pair of rectifying diodes, each connected to one of said electrodes, a pair of biasing power source means each including a resistor and supplying biasing voltage to one of said rectifying diodes, a pair of capacitors, and means to supply at least one series of pulse signals through said capacitors to said two rectifying diodes and to each one of said two electrodes of said tunnel diode.

33. A flip-flop comprising only one, voltage controlled device of the type having a characteristic with a negative resistance region between two regions of positive resistance, means connected across said device to bias it for bistability, two different power source means each including only one rectifier and an output, said outputs being across said device, and means to supply at least one series of controlling signal pulses through said rectifiers to said device.

34. A bistable, binary circuit comprising a common device having a characteristic with a negative resistance region between two positive resistance regions, means connected across said device to bias it for bistability in one of said two positive resistance regions, two different power and biasing circuit means having said device connected between them to control one of them by one of its said two bistable conditions, each power circuit means including a switchable, one-directional element, and means to supply controlling pulses to said common device through both of said power circuit means and their one-directional elements to switch the bistable condition of said device and to switch one of said one-directional elements.

35. A bistable, binary circuit comprising a common device having a characteristic with a negative resistance region between two positive resistance regions, means connected across said device to bias it for bistability in one of said two positive resistance regions, two different power and biasing circuit means having said device connected between them to control one of them by one of its said two bistable conditions, each power circuit means including a switchable, one-directional element, and means to supply controlling pulses to said common device through both of said power circuit means and their one-directional elements to switch the bistable condition of said device and to switch one of said one-directional elements, said device comprising a diode and said last named means comprising a common connection to both of said power circuit means and a source for only one signal set of pulses to modulate alternately the fronts and rears of the single, square type, wave form produced by said two power circuit means.

36. A bistable, binary circuit comprising a common device having a characteristic with a negative resistance region between two positive resistance regions, means connected across said device to bias it for bistability in one of said two positive resistance regions, two different power and biasing circuit means having said device connected between them to control one of them by one of its said two bistable conditions, each power circuit means including a switchable, one-directional element, and means to supply controlling pulses to said common device through both of said power circuit means and their one-directional elements to switch the bistable condition of said device and to switch one of said one-directional elements, said device comprising a diode, and said last named means comprising a common connection to both of said power circuit means and sources for two differential signal sets of pulses to alternately modulate the fronts and rears of the single, square type, wave form produced by said two power circuit means according to two different useful signals.

37. A bistable multivibrator comprising in combination; a tunnel diode having two electrodes and operable in a first and second state of operation; biasing means for placing said tunnel diode into one of said states of operation; input means for applying sequential input pulses of predetermined polarity and amplitude to alternate electrodes of said tunnel diode to alternately switch states of operation; and output means for sensing the switching of states of operation of said tunnel diode.

38. A trigger circuit comprising a negative resistance diode having a characteristic curve which exhibits a negative resistance region intermediate a pair of positive resistance ranges, means for biasing said negative resistance diode for bistable operation, said biasing means including a first impedance connected between the anode of said negative resistance diode and a reference point and a second impedance connected between the cathode of said negative resistance diode and a negative biasing source, a pair of diodes having corresponding first electrodes and corresponding second electrodes, a first diode of the pair having its first electrode connected to the cathode of said negative resistance diode and its second electrode connected to a junction point, the second diode of the pair having its first electrode connected to the anode of said negative resistance diode and its second electrode connected to said junction point, and means for deriving bilevel output signals from said negative resistance diode, in response to the application of unipolar input pulses to said junction point.

39. A trigger circuit comprising a negative resistance diode having a characteristic curve which exhibits a negative resistance region intermediate a pair of positive resistance ranges, means for biasing said negative resistance diode for bistable operation, said biasing means including a first impedance connected between the anode of said negative resistance diode and a point of first potential and a second impedance connected between the cathode of said negative resistance diode and a point of second potential which is negative relative to said first potential, a pair of diodes having corresponding first electrodes and corresponding second electrodes, a first diode of the pair having its first electrode connected to the cathode of said negative resistance diode and its second electrode connected to a junction point, the second diode of the pair having its first electrode connected to the anode of said negative resistance diode and its second electrode connected to said junction point, and means for deriving bilevel output signals from said negative resistance diode, in response to the application of unipolar input pulses to said junction point.

40. A bistable multivibrator operative with sequential input pulses and comprising in combination: a tunnel diode having a first and a second state of operation; biasing means for placing said tunnel diode into a first state of operation; input means including diode means, said diode means being biased by the voltage across said tunnel diode for alternately switching states of operation of said tunnel diode in response to said sequential input pulses; and output means for sensing the changes of states of operation of said tunnel diode.

41. A bistable multivibrator comprising in combination: a tunnel diode having at least two electrodes and a first and a second state of operation; biasing means for placing said tunnel diode into a first state of operation; signal input means including a first diode connected to one of said electrodes, a second diode connected to the other of said electrodes, said tunnel diode, when in said first state of operation biasing said first diode near conduction and when in said second state of operation biasing said second diode near conduction, an input pulse applied to both said diodes causing the diode biased near conduction to conduct to thereby switch the state of operation of said tunnel diode; and output means for sensing the switching of states of said tunnel diode upon subsequent input pulses.

References Cited

UNITED STATES PATENTS

| | | | |
|---|---|---|---|
| 2,944,164 | 7/1960 | Odell | 307—88.5 |
| 2,975,377 | 3/1961 | Price | 307—88.5 X |

OTHER REFERENCES

Electronics, Nov. 27, 1959, "The Tunnel Diode-Circuits and Applications," pp. 61–64.

Electronics, Aug. 7, 1959, "Tunnel Diode: Big Impact?" p. 61,

IRE Wescon Convention Record, Part 3, Electronic Devices, Aug. 18, 1959, pp. 9-31.

Kauke: Negative Resistance in Germanium Diodes, Radio-Electronic Engineering, April 1953, pp. 8–10.

RCA Technical Notes No. 260, June 1959, "Pulse Count Circuit."

Shea: Transistor Circuit Engineering, Wiley, 1957, p. 89.

ARTHUR GAUSS, *Primary Examiner.*

HERMAN K. SAALBACH, B. MILLER, *Examiners.*

D. R. PRESSMAN, J. JORDAN, *Assistant Examiners.*